(12) United States Patent
Wu et al.

(10) Patent No.: US 9,635,583 B2
(45) Date of Patent: Apr. 25, 2017

(54) METHOD, APPARATUS AND NETWORK SYSTEM FOR CONTROLLING NETWORK CONGESTION

(71) Applicant: Huawei Technologies Co., Ltd., Shenzhen, Guangdong (CN)

(72) Inventors: Tianyu Wu, Shenzhen (CN); Chen Chen, Shenzhen (CN); Shuai Hao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 194 days.

(21) Appl. No.: 14/467,874

(22) Filed: Aug. 25, 2014

(65) Prior Publication Data
US 2015/0009814 A1    Jan. 8, 2015

Related U.S. Application Data

(63) Continuation of application No. PCT/CN2013/071814, filed on Feb. 25, 2013.

(30) Foreign Application Priority Data

Feb. 24, 2012 (CN) .......................... 2012 1 0044152

(51) Int. Cl.
*H04W 28/02* (2009.01)
*H04W 74/08* (2009.01)
*H04W 84/12* (2009.01)

(52) U.S. Cl.
CPC ..... *H04W 28/0289* (2013.01); *H04W 74/085* (2013.01); *H04W 84/12* (2013.01)

(58) Field of Classification Search
CPC ......... H04W 28/0252; H04W 28/0284; H04W 28/0289; H04W 74/08; H04W 74/085
See application file for complete search history.

(56) References Cited

U.S. PATENT DOCUMENTS

2002/0146032 A1  10/2002  Attimont et al.
2005/0094558 A1*  5/2005  Lu ........................ H04W 28/08
                                                              370/229
(Continued)

FOREIGN PATENT DOCUMENTS

CN      101584234 A    11/2009
CN      101888018 A    11/2010
(Continued)

OTHER PUBLICATIONS

"Draft Standard for Information technology—Telecommunications and information exchange between systems Local and metropolitan area networks—Specific requirements, Part 11:Wireless LAN Medium Access Control (MAC) and Physical Layer (PHY) Specifications, Amendment 6: Sub 1 GHz License Exempt Operation," LAN/MAN Standards Committee of the IEEE Computer Society, P802.11ah/D0.1, pp. i-311, Institute of Electrical and Electronics Engineers, New York, New York (May 2013).

*Primary Examiner* — Scott M Sciacca
(74) *Attorney, Agent, or Firm* — Leydig, Voit & Mayer, Ltd.

(57) ABSTRACT

The invention provides a method, an apparatus and a system for controlling network congestion. The method includes: sending a control frame or a beacon frame to a station in a network when network congestion occurs, so as to instruct the station to enlarge a contention window when the station needs to send data. The method can achieve the congestion control for a network before collision occurs to a station, avoiding more serious network congestion caused by each station still contending for a channel after the network congestion occurs; since an access point can send a control frame or a beacon frame to the station when determining that congestion occurs to the current network, to instruct the station which needs to send data to re-determine a backoff (Continued)

time, a rapidly congestion relief of the whole network is achieved, and also a fair channel contention of each station is guaranteed.

22 Claims, 7 Drawing Sheets

(56) References Cited

U.S. PATENT DOCUMENTS

| | | | | |
|---|---|---|---|---|
| 2006/0126581 | A1* | 6/2006 | Katsumata | H04L 12/5693 370/338 |
| 2009/0279470 | A1* | 11/2009 | Seok | H04L 1/1685 370/312 |
| 2010/0034091 | A1* | 2/2010 | Hiertz | H04L 47/10 370/236 |
| 2010/0103913 | A1* | 4/2010 | Sung | H04W 74/006 370/338 |
| 2011/0044303 | A1 | 2/2011 | Ji et al. | |
| 2011/0286329 | A1* | 11/2011 | Koo | H04W 48/12 370/232 |
| 2013/0016600 | A1* | 1/2013 | Hwang | H04L 1/1883 370/216 |
| 2013/0279330 | A1 | 10/2013 | Feng et al. | |

FOREIGN PATENT DOCUMENTS

| | | |
|---|---|---|
| CN | 102111847 A | 6/2011 |
| EP | 2180751 A2 | 4/2010 |

* cited by examiner

Ths application is a continuation of International Patent Application No. PCT/CN2013/071814, filed on Feb. 25, 2013, which claims the priority benefit of Chinese Patent Application No. 201210044152.2, filed on Feb. 24, 2012, both of which are hereby incorporated by reference in their entireties.

TECHNICAL FIELD

The present invention relates to the field of communications and, in particular, relates to a method and an apparatus for controlling network congestion and a wireless local area network system.

BACKGROUND

Basic service set (Basic Service Set, BSS) is a basic element of a wireless local area network, which is composed of stations (Station, STA for short/Stations, STAs for short) within a specific overlay area and with a specific relevance. A common relevance mode of stations in a BSS is that each STA therein is associated to a central station which specializes in basic service set management, the central station is called an access point (Access Point, AP). At present, a main application scenario is the sensor network, such as smart grid (Smart. Grid, SG), where the number of STAs supported by an AP can be up to 6000. If the STAs have intensive operations, there will be a large number of STAs which need to send data to the AP within a period of time, then the STAs which are sending data may suffer a high probability of collision, which will easily cause network congestion.

In a wireless communication system adopting distributed access, for example a wireless local area network (WLAN, Wireless Local Area Network), the precondition of accessing a channel is that all stations (including normal user-oriented stations and the AP) are regarded as equal STAs. The access mode is that each STA contends for a channel by way of randomly generating a backoff time in a contention window (Contention Window, CW) and progressively decreasing to zero.

When network congestion occurs due to sending data by a large number of STAs, a method in prior art for easing network congestion is called "binary exponential backoff". In existing method, once a STA which is sending data meets with a collision, then the STA will resend (also called retransmit) the data; further, when the number of retransmission times does not reach a maximum number of data packet retransmission times, the STA doubles the CW, that is to double the contention window $CW_1$ to $2CW_1$, and randomly selects an integer in an uniform distribution of range $[0, 2CW_1]$ to calculate a needed backoff time, and then resends the data when the backoff time is up. If a collision occurs when sending the data even when the calculated backoff time is up, the STA enlarges the contention window to $4CW_1$, and randomly selects an integer in an uniform distribution of range $[0, 4CW_1]$ to calculate a needed backoff time, and then resends the data when the backoff time is up, until the contention window is enlarged to a preset maximum value $CW_{max}$.

In the above existing binary exponential backoff, the STA will double the contention window only when meeting with a collision, in addition, only the STAs which meet with collisions will double the contention window, which contributes limited control for congestion of the whole network. During serious network congestion, each STA may possibly contend for a channel after multiple collisions by using the above existing binary exponential backoff method, so as to resend the data, which suffers multiple times of unsuccessful retransmission, through the channel Therefore, the method for controlling network congestion provided by the prior art has problems of long time consumption and low efficiency.

SUMMARY

Embodiments of the present invention provide a method, an apparatus and a system for controlling network congestion, so as to rapidly reduce the congestion level of the network and improve the efficiency of congestion control.

An embodiment of the present invention provides a method for controlling network congestion, the method includes: sending a control frame or a beacon frame to a station in a network when network congestion occurs, so as to instruct the station to enlarge a contention window when the station needs to send data, the control frame or the beacon frame includes an instruction field which is used to instruct the station to enlarge the contention window when the station needs to send data.

An embodiment of the present invention provides a method for controlling network congestion, the method includes: receiving, by a station, a control frame or a beacon frame sent by an access point, the control frame or the beacon frame includes an instruction field which is used to instruct the station in a network to enlarge a contention window when the station needs to send data;
    enlarging, by the station, the contention window according to the instruction field;
    determining, by the station, a backoff time by randomly selecting a contention window value in the enlarged contention window or by taking the enlarged contention window as a contention window initial value.

An embodiment of the present invention provides an access point (AP), the access point includes: a sending module, configured to send a control frame or a beacon frame to a station in a network when network congestion occurs, so as to instruct the station to enlarge a contention window when the station needs to send data, the control frame or the beacon frame includes an instruction field which is used to instruct the station to enlarge the contention window when the station needs to send data.

An embodiment of the present invention provides an user station (STA), the user STA includes: a receiving module, configured to receive a control frame or a beacon frame sent by an access point, the control frame or the beacon frame includes an instruction field which is used to instruct the station in a network to enlarge a contention window when the station needs to send data;
    a contention window altering module, configured to enlarge the contention window according to the instruction field;
    a backoff time determining module, configured to determine a backoff time by randomly selecting a contention window value in the enlarged contention window or by taking the enlarged contention window as a contention window initial value.

An embodiment of the present invention provides a wireless local area network system, the system includes an access point and at least one station;

the access point is configured to send a control frame or a beacon frame to the station in a network when network congestion occurs, so as to instruct the station to enlarge a contention window when the station needs to send data, the control frame or the beacon frame includes an instruction field which is used to instruct the station to enlarge the contention window when the station needs to send data;

the station is configured to receive the control frame or the beacon frame sent by the access point, enlarge the contention window according to the instruction field, determine a backoff time by randomly selecting a contention window value in the enlarged contention window or by taking the enlarged contention window as a contention window initial value, the control frame or the beacon frame includes the instruction field which is used to instruct the station to enlarge the contention window when the station needs to send data.

It can be seen from the above embodiments of the present invention that, compared to the method in the prior art that a single station enlarges the contention window only after the collision occurs, the method provided by embodiments of the present invention can achieve the congestion control for a network before collision occurs to a station, thereby avoiding more serious network congestion caused by each station still contending for a channel after the network congestion occurs; in another aspect, since an access point can send a control frame or a beacon frame to the station in the network when determining that congestion occurs to the current network, so as to instruct the station which needs to send data to re-determine a backoff time when receiving the control frame or the beacon frame, a rapidly congestion relief of the whole network is achieved from the overall situation, and also a fair channel contention of each station, after re-determining a backoff time, is guaranteed.

DESCRIPTION OF EMBODIMENTS

The technical solutions in embodiments of the present invention will be described clearly and comprehensively by reference to accompanying drawings in the embodiments of the present invention. Obviously, the embodiments described are only part of the embodiments provided by the present invention, but not all of them.

Figure 1:
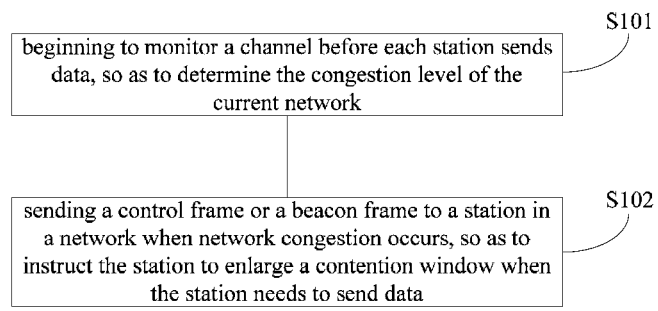
FIG. 1 is a schematic flow diagram of a method for controlling network congestion provided by an embodiment of the present invention.

Please refer to FIG. 1, which is a schematic flow diagram of a method for controlling network congestion provided by an embodiment of the present invention, the executive subject can be an access point (Access Point, AP) in a wireless local area network, the method mainly includes the following steps:

S101, beginning to monitor a channel before each station sends data, so as to determine the congestion level of the current network.

Different from the existing binary exponential backoff that a STA will only enlarge the contention window to twice after a collision occurs, in the method provided by embodiments of the present invention, an access point AP begins to monitor the channel before each STA sends data, or the access point AP monitors the channel all the time, and informs in advance the STA to enlarge the contention window according to the congestion level of the current network, rather than informing the STA to enlarge the contention window after the collision occurs to the STA in the network.

S102, sending a control frame or a beacon frame to a station in a network when network congestion occurs, so as to instruct the station to enlarge a contention window when the station needs to send data.

As an embodiment of the present invention, when the access point AP detects that the channel is busy, and the number of data packet received is less than a specific threshold, then the access point AP determines that congestion occurs in the current network. As another embodiment of the present invention, the access point AP can also determine the congestion level of the current network according to statistics such as the number of continuous collisions suffered by a station STA, the probability of collision within a period of time or the number of times of the event that the signal power is detected but the frame cannot be decoded; if a part of or all of the statistics reach a specific threshold, then it is determined that congestion occurs in the current network.

It should be noted that, in the above embodiments, the conditions which trigger the access point to send the control frame or the beacon frame to the station in the network are only examples, but not limited to "beginning to monitor a channel before each station sends data, so as to determine the congestion level of the current network" as described in step S101, for example, by way of the channel sending report information after congestion etc., rather than monitoring the channel all the time, and triggering step S102 after acquiring the report of channel congestion.

Figure 2:
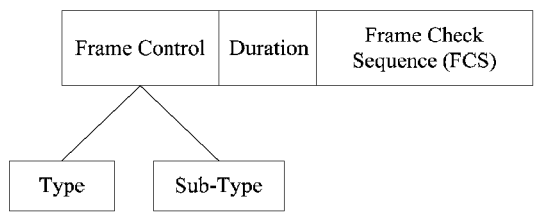
FIG. 2 is a schematic structural diagram of a control frame provided by an embodiment of the present invention.

In an embodiment of the present invention, the control frame or the beacon frame includes an instruction field which is used to instruct the station to enlarge the contention window when the station in the network needs to send data. As shown in FIG. 2, which is a schematic structural diagram of a control frame provided by an embodiment of the present invention. The newly constructed control frame includes a "frame control" field of 2 bytes (Byte), a "duration" field of 2 bytes (Byte) and a "frame check sequence (Frame Check Sequence, FCS)" field of 4 bytes (Byte), where the "duration" field is used to indicate the length of the control frame, the "FCS" field is used for error correction for each control frame, and the "frame control" field includes a "type" field and a "sub-type" field, the "sub-type" field is used to indicate that the control frame is a newly constructed control frame. The "frame control" field is the instruction field which instructs all stations or part of the stations to enlarge the contention window when the stations need to send data. When all stations or part of the stations (when the control frame is multicast by the AP to specific stations) receive the control frame, if the station just has data to send, since congestion occurs in the current network, the station enlarges the contention window CW according to the instruction of the "frame control" field, and randomly selects a value within the range of [0, CW] in the contention window to calculate a backoff time, or takes the enlarged contention window as an initial value to calculate the backoff time, for example, assuming that the station is contending for a channel, then the initial contention window $CW_{min}$ can be enlarged to $2 \times CW_{min}$, and then $2 \times CW_{min}$ is taken as the initial value to calculate the backoff time (Back off Time).

Since the "frame control" field takes less bytes, the overhead is relatively low, and the change to the original communication protocol is little, which is relatively easy to achieve. In another aspect, since the control frame or the beacon frame is broadcast to all stations in the network (or multicast to part of the stations), the stations which receive the control frame or the beacon frame will re-determine a backoff time, therefore, the method for controlling network congestion according to embodiments of the present invention provides a fair contention for all stations in re-contending a channel.

Figure 3:
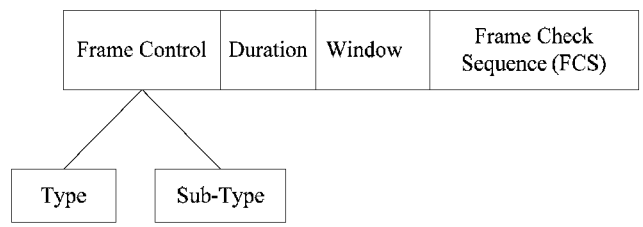
FIG. 3 is a schematic structural diagram of a control frame provided by another embodiment of the present invention.

If the AP sending the control frame or the beacon frame to the station in the network is to broadcast the control frame or the beacon frame to all stations, then the beacon frame or the control frame shown in FIG. 2 can further include a "window" field, as shown in FIG. 3, which is a schematic structural diagram of a control frame provided by another embodiment of the present invention. The newly constructed control frame includes a "frame control" field of 2 bytes (Byte), a "duration" field of 2 bytes (Byte) and a "frame check sequence" field of 4 bytes (Byte) and a "window" field of 1 byte (Byte). The value $h_{cw}$ of the "window" field is used to instruct all stations in the network to enlarge the current contention window according to the $h_{cw}$ when the STAs need to send data, for example, to instruct all stations in the network to enlarge the current contention window to a product of $h_{cw}$ and $CW_{min}$, that is, $h_{cw} \times CW_{min}$ (for convenience of describing, the $h_{cw} \times CW_{min}$ is recorded as $CW_{def}$), and randomly select a contention window value in the enlarged contention window, i. e. in the range of [0, $CW_{def}$] to calculate the backoff time, or take the enlarged contention window $CW_{def}$ as the initial value to calculate the backoff time, where $CW_{min}$ is the minimum value of the contention window.

Figure 4A:
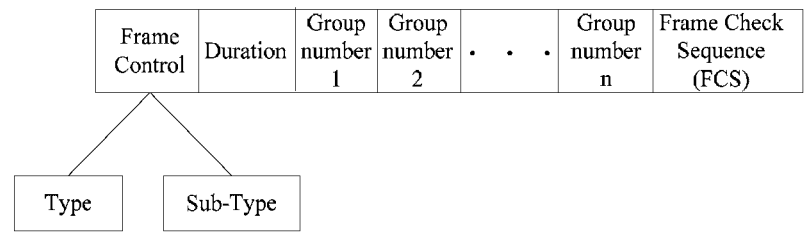
FIG. 4a is a schematic structural diagram of a control frame provided by another embodiment of the present invention.

If the access point detects that congestion occurs in the current network through monitoring the channel, and part of the stations are about to send data, then the access point can multicast a control frame to the part of the stations in the network; the multicast control frame includes at least one "group number" field in addition to the "frame control" field of 2 bytes (Byte), the "duration" field of 2 bytes (Byte) and the "frame check sequence" field of 4 bytes (Byte) shown in FIG. 2, the "group number" field is used to indicate the stations in the network which need to receive the multicast control frame. As shown in FIG. 4a, which is a schematic structural diagram of a control frame provided by another embodiment of the present invention, "group number 1" field indicates that the station in the network which needs to receive the multicast control frame is station 1 (STA1), "group number 2" field indicates that the station in the network which needs to receive the multicast control frame is station 2 (STA2), . . . , "group number n" field indicates that the station in the network which needs to receive the multicast control frame is station n (STAn) etc.

When the control frame multicast by the AP is the control frame shown in FIG. 4a, and when part of the stations receive the control frame, if the stations just have data to send, since congestion occurs in the current network, the stations enlarges the contention window CW according to the instruction of the "frame control" field, and randomly selects a contention window value within the range of [0, CW] to calculate a backoff time, or takes the enlarged contention window as a contention window initial value to calculate the backoff time; assuming that the station 1 (STA1) corresponding to "group number 1" is contending for a channel, then the STA1 can enlarge the initial contention window $CW_{min}$ to twice of $CW_{min}$, that is, $2 \times CW_{min}$, and take $2 \times CW_{min}$ as the initial value of the contention window to calculate the backoff time; assuming that the station 2 (STA2) corresponding to "group number 2" is contending for a channel, then the STA2 can enlarge the initial contention window $CW_{min}$ to twice of $CW_{min}$, that is, $2 \times CW_{min}$, and take $2 \times CW_{min}$ as the initial value of the contention window to calculate the backoff time, it is similar when stations corresponding to other group numbers receive the control frame shown in FIG. 4a.

Figure 4B:
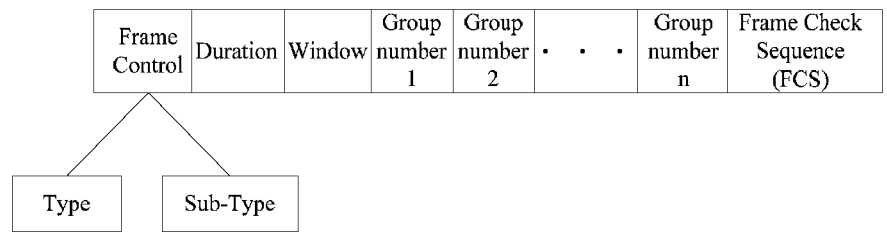
FIG. 4b is a schematic structural diagram of a control frame provided by another embodiment of the present invention.

The control frame shown in FIG. 4a can also include a "window" field with a value of $h_{cw}$ as shown in FIG. 3; as shown in FIG. 4b, FIG. 4b is a schematic structural diagram of a control frame provided by another embodiment of the present invention. Since the control frame includes a single "window" field, the stations corresponding to all "group number" fields enlarge the current contention window according to the value of $h_{cw}$ of the same "window" field when the stations receive the control frame and need to send data, for example, station 1 (STA1) enlarges the current contention window to a product of $h_{cw}$ and $CW_{min}$, that is $h_{cw} \times CW_{min}$, when STA1 needs to send data, station 2

(STA2) also enlarges the current contention window to a product of $h_{cw}$ and $CW_{min}$, that is $h_{cw} \times CW_{min}$, when STA2 needs to send data, etc.

Figure 5:
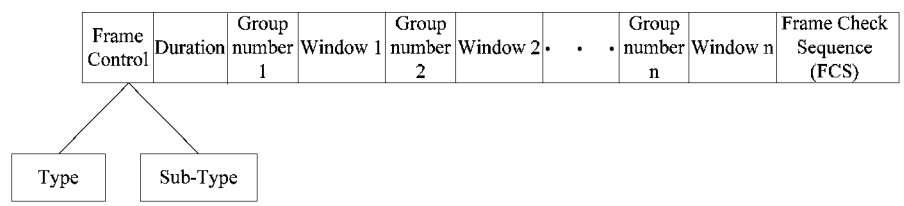
FIG. 5 is a schematic structural diagram of a control frame provided by another embodiment of the present invention.

As another embodiment of the present invention, the control frame shown in FIG. 4b can also include "window" fields, the number of which is equal to the number of the "group number I" fields, each "window" field corresponds to each "group number I" field. As shown in FIG. 5, which is a schematic structural diagram of a control frame provided by another embodiment of the present invention, where the value $h_{icw}$ of each "window" field is used to instruct the station corresponding to each "group number I" field which corresponds to the each "window" field to enlarge the contention window to a product of $h_c$ and $CW_{min}$ when the station needs to send data, that is, the value $h_{cw1}$ of the "window 1" field is used to instruct the station 1 (STA1) corresponding to each "group number 1" field which corresponds to the "window 1" field to enlarge the current contention window according to the value $h_{cw1}$ of the "window 1" field when STA1 needs to send data, for example, station 1 (STA1) enlarges the current contention window to $h_{cw1} \times CW_{min}$ when STA1 needs to send data; the value $h_{cw2}$ of the "window 2" field is used to instruct the station 2 (STA2) corresponding to each "group number 2" field which corresponds to the "window 2" field to enlarge the current contention window according to the value $h_{cw2}$ of the "window 2" field when STA2 needs to send data, for example, STA2 enlarges the current contention window to $h_{cw2} > CW_{min}$ when STA2 needs to send data, . . . , the value $h_{cwn}$ of the "window n" field is used to instruct the station n (STAn) corresponding to each "group number n" field which corresponds to the "window n" field to enlarge the current contention window according to the value $h_{cwn}$ of the "window n" field when STAn needs to send data, for example, STAn enlarges the current contention window to $h_{cwn} \times CW_{min}$ when STAn needs to send data, etc.

It can be seen from the above method for controlling network congestion provided by embodiments of the present invention that, in one aspect, since an access point monitors the channel all the time before each station sends data, compared to the method in the prior art that a single station enlarges the contention window only after the collision occurs, the method provided by embodiments of the present invention can achieve the congestion control for a network before collision occurs to a station, thereby avoiding more serious network congestion caused by each station still contending for a channel after the network congestion occurs; in another aspect, since the access point can send a control frame or a beacon frame to the station in the network when determining that congestion occurs to the current network, so as to instruct the station which needs to send data to re-determine a backoff time when receiving the control frame or the beacon frame, a rapidly congestion relief of the whole network is achieved from the overall situation, and also a fair channel contention of each station, after re-determining a backoff time, is guaranteed.

Figure 6:
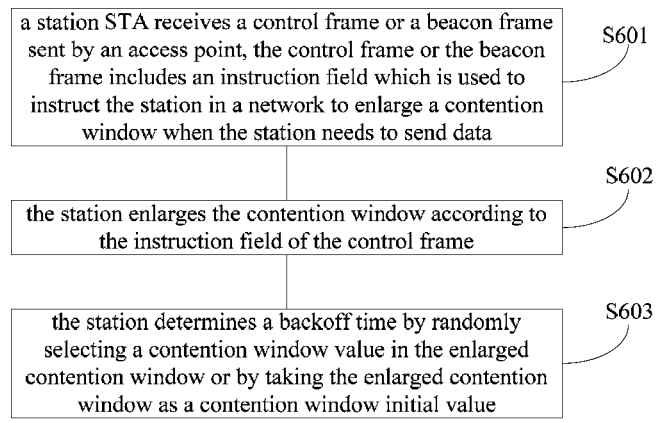
FIG. 6 is a schematic flow diagram of a method for controlling network congestion provided by another embodiment of the present invention.

Please refer to FIG. 6, which is a schematic flow diagram of a method for controlling network congestion provided by another embodiment of the present invention, the method includes the following steps:

S601, a station STA receives a control frame or a beacon frame sent by an access point, the control frame or the beacon frame includes an instruction field which is used to instruct the station in a network to enlarge a contention window when the station needs to send data.

In this embodiment, if the control frame received by the station STA is a control frame broadcast or multicast by an access point, the structure of which is as shown in FIG. 2, including a "frame control" field of 2 bytes (Byte), a "duration" field of 2 bytes (Byte) and a "frame check sequence (Frame Check Sequence, FCS)" field of 4 bytes (Byte), where the "duration" field is used to indicate the length of the control frame, the "FCS" field is used for error correction for each control frame, and the "frame control" field includes a "type" field and a "sub-type" field, the "sub-type" field is used to indicate that the control frame is a newly constructed control frame. The "frame control" field is the instruction field which instructs all stations or part of the stations to enlarge the contention window when the stations need to send data.

S602, the station STA enlarges the contention window according to the instruction field of the control frame.

In embodiments of the present invention, there are two situations when the station needs to send data, the first one of which is that the station already has data but the channel is busy thus the station is in a backing off state, the second one of which is that the station just received data and is contending for a channel, that is, the station is contending for a channel and is about to send the data received through the channel which is acquired through contention.

As for the first situation, i. e. the STA received the control frame or the beacon frame broadcast by the access point and the STA is backing off, as an embodiment that the station STA enlarges the contention window according to the instruction field of the control frame, the station STA can enlarge the currently used contention window CW to twice of CW, i. e. 2×CW; as another embodiment that the station STA enlarges the contention window according to the instruction field of the control frame, the station STA can also use a specific value rather than the currently used contention window as a standard to enlarge the contention window, that is to keep the currently used contention window unchanged, and enlarge the contention window for next time to twice of $CW_{min}$, i. e. $2 \times CW_{min}$, and take $2 \times CW_{min}$ as the initial value of the contention window for next time, where the $CW_{min}$ is a preset minimum value of the contention window, and the $CW_{min}$ is a preset minimum value which can be set according to the provision of standards or protocols.

As for the second situation, that is, the STA has received the control frame or the beacon frame broadcast by the access point and the STA is contending for a channel, as an embodiment that the station STA enlarges the contention window according to the instruction field of the control frame, the station STA enlarges the contention window for currently contending for the channel to twice of $CW_{min}$, i. e. $2 \times CW_{min}$, where the $CW_{min}$ is the preset minimum value of the contention window.

The control frame shown in FIG. 2 only instructs all stations or part of the stations in the network to enlarge the contention window when the stations need to send data, however, the enlargement range is decided by the stations which receive the control frame. In the embodiments of the present invention, a coefficient may be carried in the control frame by the access point, which is used to instruct all stations or part of the stations in the network to enlarge the contention window according to the coefficient when the stations need to send data, that is, if the access point broadcasts the control frame or beacon frame to all stations in the network, then the control frame or the beacon frame can further include a "window" field with value of $h_{cw}$, as shown in FIG. 3, which is a schematic structural diagram of a control frame provided by another embodiment of the present invention. The value $h_{cw}$ of the "window" field is used to instruct all stations in the network to enlarge the current contention window according to the $h_{cw}$ when the stations needs to send data. For example, if the station STA is backing off, then the STA enlarges the currently used contention window to a product of $h_{cw}$ and $CW_{min}$, i. e. $h_{cw} \times CW_{min}$, when receiving the control frame carrying a "window" field with a value of $h_{cw}$, where the $CW_{min}$ is the preset minimum value of the contention window; or, if the station STA is contending for a channel, then the STA enlarges the contention window for contending a channel to a product of $h_{cw}$ and $CW_{min}$, i. e. $h_{cw} \times CW_{min}$, when receiving the control frame carrying a "window" field with a value of $h_{cw}$.

If the control frame received by the station STA is multicast by the access point, then the multicast control frame further includes at least one "group number" field, used to indicate the stations in the network which need to receive the control frame. As shown in FIG. 4a, which is a schematic structural diagram of a control frame provided by another embodiment of the present invention, "group number 1" field instructs that the station in the network which needs to receive the multicast control frame is station 1 (STA1), "group number 2" field instructs that the station in the network which needs to receive the multicast control frame is station 2 (STA2), . . . , "group number n" field instructs that the station in the network which needs to receive the multicast control frame is station n (STAn) etc. If part of the stations in the network receive the control frame shown in FIG. 4a, when station 1 (STA1) corresponding to "group number 1" field, station 2 (STA2) corresponding to "group number 2" field, . . . , station n (STAn) corresponding to "group number n" have data to send and are backing off, all of them can enlarge the currently used contention window CW to twice of the contention window CW, i. e. $2 \times CW$, or, enlarge the contention window for next time to twice of $CW_{min}$, i. e. $2 \times CW_{min}$ rather than changing the currently used contention window, and take $2 \times CW_{min}$ as the initial value of the contention window for next time, where $CW_{min}$ is the preset minimum value of the contention window. If part of the stations in the network receive the control frame shown in FIG. 4a, when station 1 (STA1) corresponding to "group number 1" field, station 2 (STA2) corresponding to "group number 2" field, . . . , station n (STAn) corresponding to "group number n" have data to send and are contending for a channel, all of them can enlarge the currently used contention window to twice of $CW_{min}$, i. e. $2 \times CW_{min}$, where $CW_{min}$ is the preset minimum value of the contention window.

If the structure of the control frame multicast by the access point is as shown in FIG. 4b, that is, the control frame includes a "window" field with a value of $h_{cw}$ since the control frame includes a single "window" field, the stations corresponding to all "group number" fields enlarge the current contention window according to the value of $h_{cw}$ of the same "window" field when the stations receive the control frame and need to send data, for example, station 1 (STA1) enlarges the current contention window to a product of $h_{cw}$ and $CW_{min}$, that is $h_{cw} \times CW_{min}$, when STA1 needs to send data, station 2 (STA2) also enlarges the current contention window to a product of $h_{cw}$ and $CW_{min}$, that is $h_{cw} \times CW_{min}$, when STA2 needs to send data, etc.

If the control frame multicast by the access point further includes "window" fields, the number of which is equal to the number of the group number fields, each "window" field corresponds to a "group number" field, as shown in FIG. 5. Where, the value $h_{cwi}$ of each "window" field is used to instruct the station corresponding to each "group number I" field which corresponds to the each "window" field to enlarge the contention window to a product of $h_{cwi}$ and $CW_{min}$ when the station needs to send data, that is, the value $h_{cwi}$ of each window field is used to instruct the station corresponding to each "group number I" field which corresponds to the each window field to enlarge the contention window to a product of $h_{cwi}$ and $CW_{min}$ when the STA needs to send data, for example, station 1 (STA1) enlarges the current contention window to $h_{cw1} \times CW_{min}$ when STA1 needs to send data; the value $h_{cw2}$ of the "window 2" field is used to instruct the station 2 (STA2) corresponding to each "group number 2" field which corresponds to the "window 2" field to enlarge the current contention window according to the value $h_{cw2}$ of the "window 2" field when STA2 needs to send data, for example, station 2 (STA2) enlarges the current contention window to $h_{cw2} \times CW_{min}$ when STA2 needs to send data, . . . , the value of the "window n" field is used to instruct the station n (STAn) corresponding to each "group number n" field which corresponds to the "window n" field to enlarge the current contention window according to the value $h_{cwn}$ of the "window n" field when STAn needs to send data, for example, station n (STAn) enlarges the current contention window to $h_{cwn} \times CW_{min}$ when STAn needs to send data, etc.

S603, the station STA determines a backoff time by randomly selecting a contention window value in the enlarged contention window or by taking the enlarged contention window as a contention window initial value.

As discussed above, assuming that the value of the currently used contention window is CW, and the enlarged contention window is $2 \times CW$, or, assuming that the value of the enlarged contention window is $h_{cw} \times CW_{min}$ ($h_{cw} \times CW_{min}$ is denoted as $CW_{def}$), or, assuming that the enlarged contention window value is $2 \times CW_{min}$, where $h_{cw}$ is the value of the "window" field, $CW_{min}$ is the preset minimum value of the contention window, when the station STA which received the control frame has data to send and is backing off, the station STA can randomly select a value within [0, $2 \times CW$] or [0, $CW_{def}$], and then multiply the value by a corresponding protocol time slot to acquire a backoff time (Back off Time), the equation is $T_{BoT}$=Random (0, $2 \times CW$)$\times T_{st}$, or, $T_{BoT}$=Random (0, $CW_{def}$)$\times T_{st}$, in the equation, $T_{BoT}$ is the backoff time, Random ( ) is a random selection function, $T_{st}$ is the protocol time slot.

In embodiments of the present invention, the enlarged contention window can be regarded as the initial value to determine the backoff time. For example, when the station STA which received the control frame has data to send and is contending for a channel, the station STA can select the enlarged contention window $2 \times CW_{min}$ or $CW_{def}$ as the initial value of the current contention window, and then multiply the value by a corresponding protocol time slot to acquire a backoff time, the equation is $T_{BoT}=2 \times CW_{min} \times t_{st}$, or, $T_{BoT}=CW_{def} \times T_{st}$, in the equation, $T_{BoT}$ is the backoff time, $T_{st}$ is the protocol time slot.

Figure 7A:
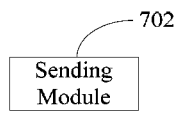
FIG. 7a is a schematic structural diagram of an apparatus for controlling network congestion provided by an embodiment of the present invention.

Please refer to FIG. 7a, which is a schematic structural diagram of an apparatus for controlling network congestion provided by an embodiment of the present invention. For convenience of describing, only the parts relevant to the embodiments of the present invention are illustrated. The apparatus for controlling network congestion shown in FIG. 7a can be an access point (Access Point, AP) in a wireless local area network, which includes:

a sending module 702, configured to send a control frame or a beacon frame to a station in the network when network congestion occurs, so as to instruct the station in the network to enlarge a contention window when the station needs to send data, the control frame or the beacon frame includes an instruction field which is used to instruct the station in the network to enlarge the contention window when the station needs to send data.

Figure 7B:
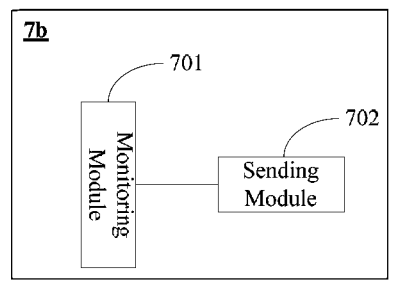
FIG. 7b is a schematic structural diagram of an apparatus for controlling network congestion provided by another embodiment of the present invention.

The apparatus for controlling network congestion shown in FIG. 7a can further include a monitoring module 701, as shown in FIG. 7b, which is an apparatus 7b for controlling network congestion provided by another embodiment of the present invention. The monitoring module 701 is configured to begin to monitor a channel before each station sends data, so as to determine the congestion level of the current network, the sending module 702 can acquire the channel monitoring result of the monitoring module 701, so as to be informed that whether congestion occurs to the current network or not.

It should be noted that, in the above implementing manners of the apparatus for controlling network congestion, the division of each function module is only an example for illustration, in practical applications, the above functions can be accomplished by different functional modules, that is to divide the interior structure of the apparatus for controlling network congestion into different functional modules to accomplish all or part of the above functions according to needs, for example for configuration requirement of corresponding hardware or for convenience of software implementation. Moreover, in practical applications, the corresponding functional module of this embodiment can be implemented by corresponding hardware, and can also be implemented by corresponding software executed by corresponding hardware, for example, the preceding monitoring module can be a hardware which executes the beginning to monitor the channel before each STA sends data so as to determine the congestion level of the current network, such as a monitor, and also can be a general processor or other hardware device which can execute corresponding computer program to accomplish the preceding function; as another example, the preceding sending module can be a hardware which executes the sending the control frame or the beacon frame to stations in the network when determining that congestion occurs to the current network, such as a transmitter, and also can be a general processor or other hardware device which can execute corresponding computer program to accomplish the preceding function (each embodiment provided by the present specification can use the above described principle).

In the apparatus for controlling network congestion shown in FIG. 7a or FIG. 7b, if the sending module 702 sending the control frame or the beacon frame is to broadcast the control frame or the beacon frame to all stations in the network, then the control frame or the beacon frame further includes a "window" field with a value of 11, as shown in FIG. 3. The value $h_{cw}$ of the "window" field shown in FIG. 3 is used to instruct the station to enlarge the contention window according to the $h_{cw}$ when the station needs to send data. For example, the instructing the station to enlarge a contention window when the station needs to send data includes: instructing all the stations to enlarge the contention windows of all the stations to a product of $h_{cw}$ and $CW_{min}$ when the stations need to send data, the $CW_{min}$ is a preset minimum value of the contention window. If the sending module 702 sending the control frame or the beacon frame is to multicast the control frame to part of the stations in the network, then the control frame further includes at least one "group number" field (including "group number 1" field, "group number 2" field, . . . , "group number n" field), as shown in FIG. 4a, the "group number" field is used to indicate the station in the network which needs to receive the control frame.

Further, the control frame, which includes at least one group number field, multicast by the sending module 702 can further include a "window" field with a value of $h_{cw}$, as shown in FIG. 4b, the value $h_c$, of the "window" field is used to instruct the station, which needs to receive the control frame, in the network to enlarge the current contention window according to the value $h_{cw}$ of the "window" field when the station needs to send data, for example, instructing the station, which needs to receive the control frame, in the network to enlarge the contention window to a product of $h_{cw}$ and $CW_{min}$ when the station needs to send data, the $CW_{min}$ is a preset minimum value of the contention window.

Further, the control frame, which includes at least one "group number" field, multicast by the sending module 702 can further includes "window" fields, the number of which is equal to the number of "group number" fields, as shown in FIG. 5. Each "window" field corresponds to each "group number I" field, the value $h_{cwi}$ of each "window" field is used to instruct the station corresponding to each "group number I" field which corresponds to the each "window" field to enlarge the current contention window according to the value $h_{cw}$ of the "window" field when the STA needs to send data, for example, instructing the station corresponding to each "group number I" field which corresponds to the each "window" field to enlarge the contention window to a product of $h_{cw}$ and $CW_{min}$ when the STA needs to send data, the $CW_{min}$ is a preset minimum value of the contention window.

Figure 8:
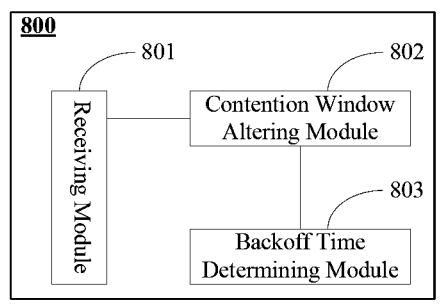
FIG. 8 is a schematic structural diagram of an apparatus for controlling network congestion provided by another embodiment of the present invention.

Please refer to FIG. 8, which is a schematic structural diagram of an apparatus 800 for controlling network congestion provided by another embodiment of the present invention. For convenience of describing, only the parts relevant to the embodiments of the present invention are illustrated. The apparatus 800 for controlling network congestion can be a station (Station, STA) in a wireless local area network, which includes a receiving module 801, a contention window altering module 802 and a backoff time determining module 803, where:

the receiving module 801 is configured to receive a control frame or a beacon frame sent by an access point, the control frame or the beacon frame includes an instruction field which is used to instruct the station in the network to enlarge a contention window when the station needs to send data;

the contention window altering module 802 is configured to enlarge the contention window according to the instruction field;

the backoff time determining module 803 is configured to determine a backoff time by randomly selecting a contention window value in the enlarged contention window or by taking the enlarged contention window as a contention window initial value.

It should be noted that, in the above implementing manners of the device for controlling network congestion, the division of each function module is only an example for illustration, in practical applications, the above functions can be accomplished by different functional modules, that is to divide the interior structure of the device for controlling network congestion into different functional modules to accomplish all or part of the above functions according to needs, for example for configuration requirement of corresponding hardware or for convenience of software implementation. Moreover, in practical applications, the corresponding functional module of this embodiment can be implemented by corresponding hardware, and can also be implemented by corresponding software executed by corresponding hardware, for example, the preceding receiving module can be a hardware which executes the receiving the control frame or the beacon frame sent by the access point, such as a receiver, and also can be a general processor or other hardware device which can execute corresponding computer program to accomplish the preceding function; as another example, the preceding contention window altering module can be a hardware which executes the enlarging the contention window according to the instruction field, such as a contention window altering device, and also can be a general processor or other hardware device which can execute corresponding computer program to accomplish the preceding function (each embodiment provided by the present specification can use the above described principle).

Figure 9A:
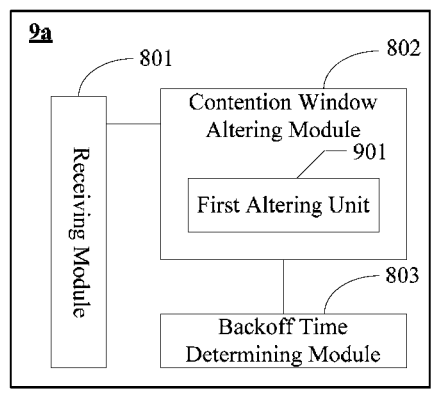
FIG. 9a is a schematic structural diagram of an apparatus for controlling network congestion provided by another embodiment of the present invention.
Figure 9B:
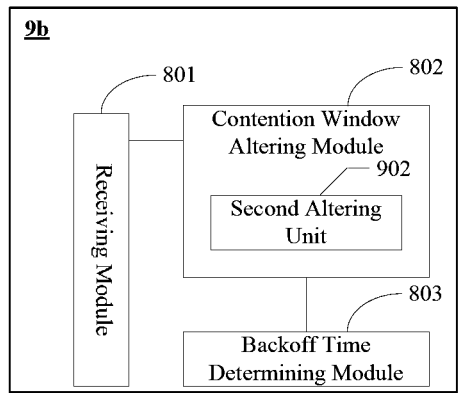
FIG. 9b is a schematic structural diagram of an apparatus for controlling network congestion provided by another embodiment of the present invention.

If the control frame received by the receiving module 801 is the control frame or the beacon frame broadcast by the access point, and the apparatus is backing off, then the contention window altering module 802 shown in FIG. 8 can further include a first altering unit 901 or a second altering unit 902, as shown in FIG. 9a or FIG. 9b, which is an apparatus for controlling network congestion provided by another embodiment of the present invention.

Where the apparatus 9b for controlling network congestion includes:
the first altering unit 901, configured to enlarge the currently used contention window CW to twice of CW, i. e. 2×CW;

Where the apparatus 9b for controlling network congestion includes:
the second altering unit 902, configured to enlarge the contention window for next time to twice of $CW_{min}$, the $CW_{min}$ is a preset minimum value of the contention window.

Figure 9C:
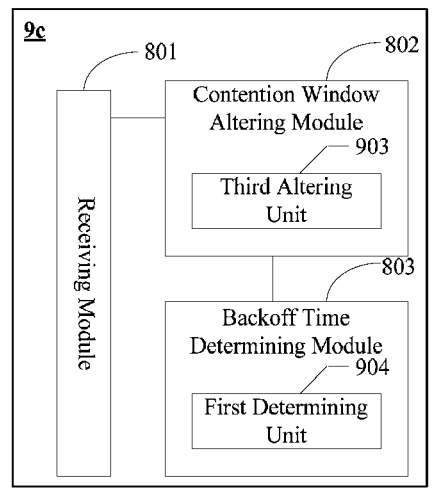
FIG. 9c is a schematic structural diagram of an apparatus for controlling network congestion provided by another embodiment of the present invention.

If the control frame or the beacon frame received by the receiving module 801 is broadcast by the access point, and the apparatus is contending for a channel, then the contention window altering module 802 shown in FIG. 8 can further include a third altering unit 903, the backoff time determining module 803 can include a first determining unit 904, as shown in FIG. 9c, which is an apparatus for controlling network congestion provided by another embodiment of the present invention, where the apparatus 9c for controlling network congestion includes:
the third altering unit 903, configured to enlarge the current contention window contending for a channel to twice of $CW_{min}$, i. e. $2×CW_{min}$, the $CW_{min}$ is the preset minimum value of the contention window;
the first determining unit 904, configured to take the $2×CW_{min}$ as the initial value of the contention window to determine the backoff time.

Figure 10:
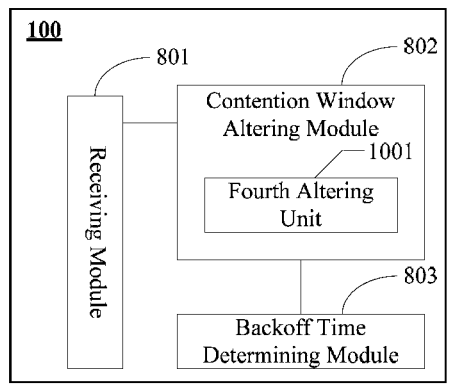
FIG. 10 is a schematic structural diagram of an apparatus for controlling network congestion provided by another embodiment of the present invention.
Figure 11:
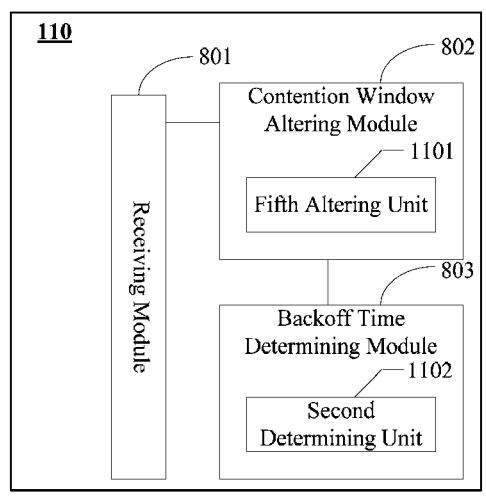
FIG. 11 is a schematic structural diagram of an apparatus for controlling network congestion provided by another embodiment of the present invention.

In the apparatus for controlling network congestion shown in FIG. 8, the control frame or the beacon frame received by the receiving module 801 further includes a "window" field with a value of $h_{cw}$. If the apparatus is backing off, then the contention window altering module 802 can include a fourth altering unit 1001, as shown in FIG. 10, which is an apparatus for controlling network congestion provided by another embodiment of the present invention. The fourth altering unit 1001 is configured to enlarge the currently used contention window to $h_{cw}×CW_{min}$, the $CW_{min}$ is the preset minimum value of the contention window. If the apparatus is contending for a channel, then the contention window altering module 802 can include a fifth altering unit 1101, the backoff time determining module 803 includes a second determining unit 1102, as shown in FIG. 11, which is an apparatus 110 for controlling network congestion provided by another embodiment of the present invention. The fifth altering unit 1101 is configured to enlarge the current contention window for contending a channel to $h_{cw}×CW_{min}$, and the second determining unit 1102 is configured to take $h_{cw}×CW_{min}$ as an initial value to determine the backoff time.

In the apparatus for controlling network congestion as shown in FIG. 8, if the control frame received by the receiving module 801 is multicast by the access point, then the control frame further includes at least one "group number" field, as shown in FIG. 4a. The "group number" field (including "group number 1" field, "group number 2" field, . . . , "group number n" field) shown in FIG. 4a is used to indicate the station in the network which needs to receive the control frame. Further, the control frame further includes a "window" field with a value of $h_{cw}$, as shown in FIG. 3. The value $h_{cw}$ of the "window" field shown in FIG. 3 is used to instruct the station, which needs to receive the control frame, in the network to enlarge the current contention window according to the value $h_{cw}$ of the "window" field when the station needs to send data. Further, the control frame further includes "window" fields, the number of which is equal to the number of "group number" fields, as shown in FIG. 5. Each "window" field as shown in FIG. 5 corresponds to each "group number I" field, the value $h_{cwi}$ of each "window" field is used to instruct the station corresponding to each "group number I" field which corresponds to the each "window" field to enlarge the current contention window according to the value $h_{cw}$ of the "window" field when the STA needs to send data, for example, instructing the station corresponding to each "group number I" field which corresponds to the each "window" field to enlarge the contention window to a product of $h_{cw}$ and $CW_{min}$ when the STA needs to send data, the $CW_{min}$ is a preset minimum value of the contention window.

Figure 12:
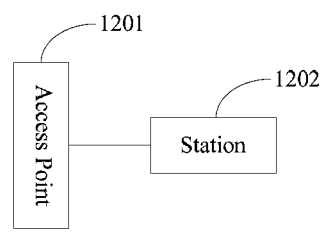
FIG. 12 is a schematic structural diagram of a system for controlling network congestion provided by an embodiment of the present invention.

Please refer to FIG. 12, a wireless local area network system is provided by an embodiment of the present invention, which can control network congestion better. For convenience of describing, only the parts relevant to the embodiments of the present invention are illustrated. The wireless local area network system shown in FIG. 12 includes an access point 1201 and a station 1202, the access point 1201 can be the apparatus for controlling network congestion shown in FIG. 7, and the station 1202 can be the control apparatus for controlling network congestion shown in any one of FIGS. 8 to 11, where:
the access point 1201 is configured to begin to monitor a channel before each station sends data, so as to determine the congestion level of the current network, and send a control frame or a beacon frame to a station in the network when network congestion occurs, so as to instruct the station in the network to enlarge a contention window when the station needs to send data, the control frame or the beacon frame includes an instruction field which is used to instruct the station to enlarge the contention window when the station needs to send data;
the station 1202 is configured to receive the control frame or the beacon frame sent by the access point 1201, enlarge the contention window according to the instruction field, determine a backoff time by randomly selecting a contention window value in the enlarged contention window or by taking the enlarged contention window as a contention window initial value, the control frame or the beacon frame includes an instruction field which is used to instruct the station in the network to enlarge the contention window when the station needs to send data.

It should be noted that, since the content of information interaction and implementation between the above modules/units is based on a same concept with the method embodiment of the present invention, and the technical effect thereof is the same with the method embodiment of the present invention, for the details please refer to the description in the method embodiment, which will not be described here.

Those of ordinary skill in the art can understand that all of or part of the steps in various methods of the above embodiments can be implemented by a program instructing relevant hardware, such as one or more or all of the following methods:

Method I includes:
beginning to monitor a channel before each station sends data, so as to determine the congestion level of the current network;
sending a control frame or a beacon frame to a station in a network when network congestion occurs, so as to instruct the station to enlarge a contention window when the station needs to send data, the control frame or the beacon frame includes an instruction field which is used to instruction the station to enlarge the contention window when the station needs to send data.

Method II includes:
receiving, by a station STA, a control frame or a beacon frame sent by an access point, the control frame or the beacon frame includes an instruction field which is used to instruct the station in a network to enlarge a contention window when the station needs to send data;
enlarging, by the station STA, the contention window according to the instruction field;
determining, by the station STA, a backoff time by randomly selecting a contention window value in the enlarged contention window or by taking the enlarged contention window as a contention window initial value.

Those of ordinary skill in the art should understand that all or a part of the steps in various methods according to the embodiments of the present invention can be implemented by a program instructing relevant hardware, and the program may be stored in a computer readable storage medium, such as a read-only memory (ROM, Read Only Memory), a random access memory (RAM, Random Access Memory), a magnetic disk, or an optical disk etc.

What is claimed is:

1. A method for controlling network congestion, comprising:
sending a control frame or a beacon frame to a station in a network when network congestion occurs, to enable the station to enlarge a contention window when the station needs to send data, wherein the control frame or the beacon frame comprises an instruction field which is used to instruct the station to enlarge the contention window when the station needs to send data;
wherein the control frame or the beacon frame further comprises a window field with a value of $h_{cw}$, and the value of $h_{cw}$ of the window field is used to instruct the station to enlarge the contention window to a product of $h_{cw}$ and $CW_{min}$, wherein the $CW_{min}$ is a minimum value of the contention window, and the value of $h_{cw}$ of the window field is a multiple of the minimum value of the contention window.

2. The method according to claim 1, wherein, the sending a control frame or a beacon frame to a station in a network includes broadcasting the control frame or the beacon frame to all stations in the network; and
the instructing the station to enlarge a contention window when the station needs to send data comprises: instructing all the stations in the network to enlarge contention windows of all the stations to the product of $h_{cw}$ and $CW_{min}$ when the stations need to send data.

3. The method according to claim 1, wherein, the sending a control frame or a beacon frame to a station in a network includes multicasting the control frame or the beacon frame to a part of the stations in the network, and the control frame further comprises at least one group number field which is used to indicate the stations in the network which need to receive the control frame.

4. The method according to claim 3, wherein the value $h_{cw}$ of the window field is used to instruct the stations, which need to receive the control frame, in the network to enlarge the contention window to the product of $h_{cw}$ and $CW_{min}$ when the stations need to send data.

5. The method according to claim 3, wherein the control frame comprises at least two window fields, wherein a number of window fields is equal to a number of the group number fields, each window field corresponds to each group number field, a value $h_{cwi}$ of each window field is used to instruct a station corresponding to a group number (i) field which corresponds to the each window field to enlarge the contention window to a product of $h_{cwi}$ and $CW_{min}$ when the station needs to send data.

6. The method according to claim 1, wherein, before the sending a control frame or a beacon frame to a station in a network, the method comprises:
beginning to monitor a channel before each station sends data, so as to determine a congestion level of the current network.

7. A method for controlling network congestion, comprising:
receiving, by a station, a control frame or a beacon frame sent by an access point, wherein the control frame or the beacon frame comprises an instruction field which is used to instruct the station in a network to enlarge a contention window when the station needs to send data;
enlarging, by the station, the contention window according to the instruction field;
determining, by the station, a backoff time by randomly selecting a contention window value in the enlarged contention window or by taking the enlarged contention window as a contention window initial value;
wherein the control frame or the beacon frame further comprises a window field with a value of $h_{cw}$, and the value of $h_{cw}$ of the window field is used to instruct the station to enlarge the contention window to a product of $h_{cw}$ and $CW_{min}$, wherein the $CW_{min}$ is a minimum value of the contention window, and the value of $h_{cw}$ of the window field is a multiple of the minimum value of the contention window.

8. The method according to claim 7, wherein,
when the station is backing off, the enlarging, by the station, the contention window according to the instruction field comprises: enlarging, by the station, the currently used contention window to the product of $h_{cw}$ and $CW_{min}$; and
when the station is contending for a channel, the enlarging, by the station, the contention window according to the instruction field comprises: enlarging, by the station, the current contention window for contending a channel to the product of $h_{cw}$ and $CW_{min}$, and the determining, by the station, a backoff time by taking the enlarged contention window as a contention window initial value comprises: determining, by the station, the backoff time by taking the product of $h_{cw}$ and $CW_{min}$ as the contention window initial value.

9. The method according to claim 7, wherein, the control frame received by the station STA is multicast by the access point, and the control frame further comprises at least one group number field which is used to indicate the stations in the network which need to receive the control frame.

10. The method according to claim 9, wherein the value $h_{cw}$ of the window field is used to instruct the stations, which need to receive the control frame, in the network to enlarge the contention window to the product of $h_{cw}$ and $CW_{min}$ when the stations need to send data.

11. The method according to claim 9, wherein the control frame comprises at least two window fields, wherein a number of the window fields is equal to a number of the group number fields, each window field corresponds to each group number field, a value $h_{cwi}$ of each window field is used to instruct a station corresponding to a group number (i) field which corresponds to the each window field to enlarge the contention window to a product of $h_{cwi}$ and $CW_{min}$ when the station needs to send data.

12. An access point (AP), comprising a processor and a non-transitory processor-readable medium having processor-executable instructions stored thereon, the processor-executable instructions including a plurality of modules, the modules including:
a sending module, configured to send a control frame or a beacon frame to a station in a network when network congestion occurs, to enable the station to enlarge a contention window when the station needs to send data, wherein the control frame or the beacon frame comprises an instruction field which is used to instruct the station to enlarge the contention window when the station needs to send data;
wherein the control frame or the beacon frame further comprises a window field with a value of $h_{cw}$; and the value of $h_{cw}$ of the window field is used to instruct the station to enlarge the contention window to a product of $h_{cw}$ and $CW_{min}$, wherein the $CW_{min}$ is a minimum value of the contention window, and the value of $h_{cw}$ of the window field is a multiple of the minimum value of the contention window.

13. The access point according to claim 12, wherein, the sending module sending the control frame or the beacon frame to the station in the network broadcasts the control frame or the beacon frame to all stations in the network; the instructing the station to enlarge a contention window when the station needs to send data comprises: instructing all the stations in the network to enlarge the contention window to the product of $h_{cw}$ and $CW_{min}$ when the stations need to send data.

14. The access point according to claim 12, wherein, the sending module sending the control frame or the beacon frame to the station in the network multicasts the control frame or the beacon frame to a part of the stations in the network, and the control frame further comprises at least one group number field which is used to indicate the stations in the network which need to receive the control frame.

15. The access point according to claim 14, wherein the value $h_{cw}$ of the window field is used to instruct the stations, which need to receive the control frame, in the network to enlarge the contention window to the product of $h_{cw}$ and $CW_{min}$ when the stations need to send data.

16. The access point according to claim 15, wherein the control frame comprises at least two window fields, wherein a number of the window fields is equal to a number of the group number fields, each window field corresponds to each group number field, a value $h_{cwi}$ of each window field is used to instruct a station corresponding to a group number (i) field which corresponds to the each window field to enlarge the contention window to a product of $h_{cwi}$ and $CW_{min}$ when the station needs to send data.

17. The access point according to claim 12, further comprising:
a monitoring module, configured to begin to monitor a channel before each station sends data, so as to determine a congestion level of the current network.

18. A user station (STA), comprising a processor and a non-transitory processor-readable medium having processor-executable instructions stored thereon, the processor-executable instructions including a plurality of modules, the modules including:
a receiving module, configured to receive a control frame or a beacon frame sent by an access point, the control frame or the beacon frame comprises an instruction field which is used to instruct a station in a network to enlarge a contention window when the station needs to send data;
a contention window altering module, configured to enlarge the contention window according to the instruction field;
a backoff time determining module, configured to determine a backoff time by randomly selecting a contention window value in the enlarged contention window or by taking the enlarged contention window as a contention window initial value;
wherein the control frame or the beacon frame further comprises a window field with a value of $h_{cw}$; and the value of $h_{cw}$ of the window field is used to instruct the station to enlarge the contention window to a product of $h_{cw}$ and $CW_{min}$, wherein the $CW_{min}$ is a minimum value of the contention window, and the value of $h_{cw}$ of the window field is a multiple of the minimum value of the contention window.

19. The user station according to claim 18, wherein,
the contention window altering module comprises a fourth altering unit, configured to enlarge the currently used contention window to the product of $h_{cw}$ and $CW_{min}$, when the user station is backing off; and
the contention window altering module comprises a fifth altering unit, configured to enlarge the current contention window for contending a channel to the product of $h_{cw}$ and $CW_{min}$, when the user station is contending for a channel, wherein the backoff time determining module comprises a second determining unit, configured to determine the backoff time by taking the product of $h_{cw}$ and $CW_{min}$ as the contention window initial value.

20. The user station according to claim 18, wherein, the control frame received by the receiving module is multicast by the access point, and the control frame further comprises at least one group number field which is used to indicate the stations in the network which need to receive the control frame.

21. The user station according to claim 20, wherein the value of $h_{cw}$ of the window field is used to instruct the stations, which need to receive the control frame, in the network to enlarge the contention window to the product of $h_{cw}$ and $CW_{min}$ when the stations need to send data.

22. The user station according to claim 20, wherein the control frame comprises at least two window fields, wherein a number of the window fields is equal to a number of the group number fields, each window field corresponds to each group number field, a value $h_{cwi}$ of each window field is used to instruct a station corresponding to a group number (i) field which corresponds to the each window field to enlarge the contention window to a product of $h_{cwi}$ and $CW_{min}$ when the station needs to send data.

\* \* \* \* \*